United States Patent
Noland et al.

(10) Patent No.: US 10,737,180 B1
(45) Date of Patent: Aug. 11, 2020

(54) COLLABORATIVE GAMING

(71) Applicant: Securus Technologies, Inc., Carrollton, TX (US)

(72) Inventors: Alexander Noland, North Richland Hills, TX (US); Connor Pickens, Little Elm, TX (US)

(73) Assignee: Securus Technologies, Inc., Carrollton, TX (US)

( * ) Notice: Subject to any disclaimer, the term of this patent is extended or adjusted under 35 U.S.C. 154(b) by 373 days.

(21) Appl. No.: 15/617,702

(22) Filed: Jun. 8, 2017

(51) Int. Cl.
*A63F 13/795* (2014.01)
*A63F 13/35* (2014.01)
*A63F 13/75* (2014.01)
*A63F 13/32* (2014.01)
*A63F 13/335* (2014.01)

(52) U.S. Cl.
CPC .......... *A63F 13/795* (2014.09); *A63F 13/32* (2014.09); *A63F 13/335* (2014.09); *A63F 13/35* (2014.09); *A63F 13/75* (2014.09)

(58) Field of Classification Search
CPC ...... A63F 13/795; A63F 13/335; A63F 13/32; A63F 13/35; A63F 13/75; A63F 13/847; A63F 13/85; A63F 13/80; A63F 13/79; A63F 13/86; A63F 13/87; A63F 2300/556; A63F 2300/5566; A63F 2300/57; A63F 2300/572; A63F 2300/577
See application file for complete search history.

(56) References Cited

U.S. PATENT DOCUMENTS

| | | | | |
|---|---|---|---|---|
| 9,064,380 | B2 * | 6/2015 | Yarbrough | G07F 17/3225 |
| 2002/0188361 | A1 * | 12/2002 | Chudley | A63F 13/12 700/92 |
| 2004/0255032 | A1 * | 12/2004 | Danieli | A63F 13/12 709/229 |
| 2013/0084985 | A1 * | 4/2013 | Green | A63F 9/24 463/40 |
| 2014/0095660 | A1 * | 4/2014 | Chan | H04L 67/1097 709/217 |
| 2016/0151707 | A1 * | 6/2016 | Takaichi | A63F 13/795 463/30 |
| 2017/0225082 | A1 * | 8/2017 | Suwa | G06F 13/00 |

FOREIGN PATENT DOCUMENTS

WO   WO-2016027746 A1 *   2/2016   ............. G06F 13/00

* cited by examiner

*Primary Examiner* — Jasson H Yoo
(74) *Attorney, Agent, or Firm* — Fogarty LLP

(57) ABSTRACT

Systems and methods for collaborative gaming are described herein. In some embodiments, a system comprises a computer system. The computer system comprises at least one processor and a memory coupled to the at least one processor. The memory stores program instructions are executable by the at least one processor to cause the computer system to perform tasks. The tasks include enabling a first user, via a first gaming device, to initiate a gaming session of a gaming application using an account of the first user, enabling a second user, via a second gaming device distinct from the first gaming device, to join the initiated gaming session; and enabling the second user, via the second gaming device, to engage in game-play in the initiated gaming session on behalf of the first user. The second user engages in the game-play using the account of the first user.

22 Claims, 4 Drawing Sheets

COLLABORATIVE GAMING

BACKGROUND

Correctional departments responsible for incarcerating inmates continue to develop methods and activities to rehabilitate the inmates for their subsequent release back into society. One aspect thought to aid in that transition is communication. By allowing prisoners to have some contact with friends and family while incarcerated, the justice system aims to facilitate their transition back into society upon release. Traditional forms of contact include telephone calls, in-person visitation, video visitation, etc. More recently, technological advances have allowed jails and prisons to provide other types of visitation, including individual-to-individual videoconferences and online chat sessions.

Other activities include educational and worker programs. The justice system can allow for inmates to access educational and worker programs so inmates can gain skills to prepare the inmates for career opportunities upon release. With these skills, the inmates may more easily access jobs, which can reduce the likelihood that the inmates will commit further criminal activity and become incarcerated again.

SUMMARY

Embodiments disclosed herein can provide a collaborative gaming environment for users. Generally, systems and methods disclosed herein allow for a user to take over a player/account of another user during game-play from a different device. In some instances, this can allow users to overcome challenges or levels of game-play that a user alone might not be able to overcome. Further, in a controlled-environment facility context, such as in jails and prisons, the collaborative gaming environment may provide a means of entertainment and rehabilitation for inmates. Other advantages of embodiments may also be achieved.

In accordance with some embodiments, a system comprises a computer system. The computer system comprises at least one processor and a memory coupled to the at least one processor. The memory stores program instructions are executable by the at least one processor to cause the computer system to perform tasks. The tasks include enabling a first user, via a first gaming device, to initiate a gaming session of a gaming application using an account of the first user, enabling a second user, via a second gaming device distinct from the first gaming device, to join the initiated gaming session; and enabling the second user, via the second gaming device, to engage in game-play in the initiated gaming session on behalf of the first user. The second user engages in the game-play using the account of the first user.

In accordance with other embodiments, a tangible computer-readable storage medium has program instructions stored thereon that, upon execution by at least one processor of a computer system, cause the computer system to perform tasks. The tasks include enabling an initiating user, via a first gaming device, to initiate a gaming session of a gaming application with an account of the initiating user; enabling a joining user, via a second gaming device separate from the first gaming device, to join the gaming session after the gaming session was initiated; enabling the joining user, via the second gaming device, to view a game-play of the gaming session; and enabling the initiating user, via the first gaming device, to relinquish control of the game-play using the account of the initiating user to the joining user for the joining user, via the second gaming device, to control the game-play using the account of the initiating user.

In accordance with further embodiments, a method comprises operating at least one computer system. Operating the at least one computer system comprises initiating a gaming session of a gaming application based on input from a first gaming device of a first user. The gaming session is initiated with an account of the first user. Operating the at least one computer system also comprises joining a second user, via a second gaming device distinct from the first gaming device, to the initiated gaming session, and providing control of game-play of the initiated gaming session to the second user, via the second gaming device, using the account of the first user.

The foregoing has outlined rather broadly the features and technical advantages of some embodiments disclosed herein in order that the detailed description that follows may be better understood. Additional features and advantages will be described hereinafter which form the subject of the claims of the invention. It should be appreciated that the conception and specific embodiments disclosed may be readily utilized as a basis for modifying or designing other structures for carrying out the same purposes of the present invention. It should also be realized that such equivalent constructions do not depart from the invention as set forth in the appended claims. The features of some embodiments, together with some objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Reference will now be made to the accompanying drawings, wherein.

Figure 1:
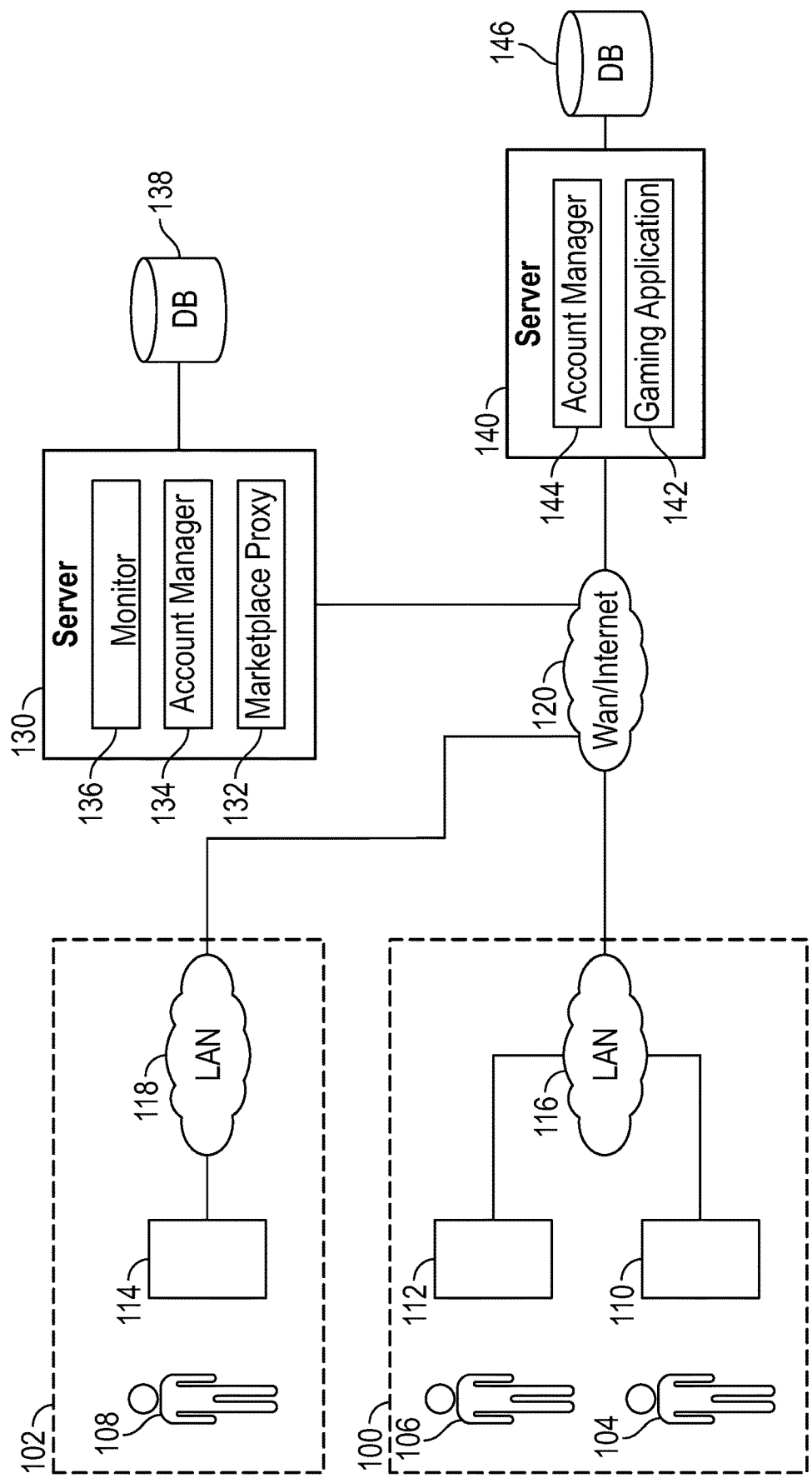
FIG. 1 is an example schematic of a collaborative gaming system according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Some embodiments now will be described more fully hereinafter with reference to the accompanying drawings. Embodiments may take many different forms, and this disclosure should not be construed as limited to the embodiments set forth herein. Rather, these embodiments are provided so that this disclosure will be thorough and complete, and will fully convey the scope of the invention to those skilled in the art. One skilled in the art may be able to use the various embodiments.

This specification discloses systems and methods for collaborative gaming, such as for online and/or virtual gaming. Some of these systems and methods are described in the context of use with one or more controlled-environment facilities; however, aspects of the systems and methods may be used outside of and without regard to a controlled-environment facility. Generally, in some examples described further below, multiple users may collaborate during a gaming session from separate gaming devices such that one user may act on behalf of another player/account (e.g., take control of that player/account) during the game-play of that gaming session. In the context of a controlled-environment facility, for example, various controls or permissions may be applied to prevent unauthorized access to games, unauthorized communications between users, and/or other unauthorized activity.

Various types of controlled-environment facilities are present today, and persons may be voluntary or involuntary residents of such facilities, whether temporarily or permanently. Examples of controlled-environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, assisted living quarters, rehabilitation clinics, such as drug and alcohol rehabilitation facilities, etc.), restricted living quarters (e.g., hotels, resorts, camps, dormitories, barracks, etc.), and the like.

For convenience of explanation, various examples discussed herein are presented in the context of correctional facilities. For instance, in some of the implementations discussed below, a controlled-environment facility may be referred to as a jail or prison, and its residents may be referred to as arrestees, detainees, or inmates. It should be understood, however, that the systems and methods described herein may be similarly applicable to other types of controlled-environment facilities and their respective residents (e.g., a hospital and its patients, a school dormitory and its students, etc.).

FIG. 1 is an example schematic of a collaborative gaming system according to some embodiments. As described further below, various functionality or aspects may be incorporated into different devices and/or may be distributed between more devices. Additionally, the location of various devices may differ in other example embodiments, such as the system may be entirely local with one or more users, some devices may be local with one or more users while other devices are remote from those one or more users, or other configurations. These configurations may include interactions with families or friends or other users outside of the one or more controlled-environment facilities, such as correctional institutions. There may be cases in which friends and families my purchase applications with enhanced security specifically to game and communicate with inmates during games. There may be an added cost for the inmate and or the friend and family. FIG. 1 is described in the context of controlled-environment facilities with some functionality having application to such context, while other contexts may omit such functionality.

FIG. 1 illustrates a first controlled-environment facility 100 and a second controlled-environment facility 102. In this illustration, a first user 104 and a second user 106 reside in the first controlled-environment facility 100, and a third user 108 resides in the second controlled-environment facility 102. In other examples, the various users may be outside of a controlled-environment facility, and may be at a same location and/or at different locations. The first user 104 has a first user gaming device 110. The second user 106 has a second user gaming device 112. The third user 108 has a third user gaming device 114. The user gaming devices 110, 112, and 114 may each be any device used for gaming, such as a tablet, a handheld device, laptop computer, personal computer, smartphone, gaming console, and/or other devices. The first user gaming device 110 and second user gaming device 112 are communicatively coupled to a network 116, which is illustrated as a Local Area Network (LAN) within the first controlled-environment facility 100, although another network may be implemented. Similarly, the third user gaming device 114 is communicatively coupled to a network 118, which is illustrated as a LAN within the second controlled-environment facility 102, although another network may be implemented. The network 116 and network 118 are further communicatively coupled to a network 120, which is illustrated as a Wide Area Network (WAN) and/or the Internet, although another network may be implemented. Any appropriate network topology may be implemented to communicatively couple various devices as described herein. Further, devices, and any networks implemented to communicatively couple those devices, may implement communications via wired and/or wireless connections.

A proxy server 130 is communicatively coupled to the network 120. The proxy server 130 can be, for example, a network appliance, a computer system, and/or the like. The proxy server 130 includes computer program instructions stored on a tangible, non-transitory storage medium and a processor (e.g., as described with respect to FIG. 5 below), and when the processor executes the computer program instructions, the processor operates a marketplace proxy module 132, an account manager module 134, and a monitoring module 136. The proxy server 130 is further communicatively coupled to a database 138. The database 138 may be part of a same device as the proxy server 130 or separate from the proxy server 130, and may be, for example, a network appliance, a computer system, and/or the like operable to implement a database.

A gaming server 140 is communicatively coupled to the network 120. The gaming server 140 can be, for example, a network appliance, a computer system, and/or the like. The gaming server 140 includes computer program instructions stored on a tangible, non-transitory storage medium and a processor (e.g., as described with respect to FIG. 5 below), and when the processor executes the computer program instructions, the processor operates a gaming application module 142 and an account manager module 144. The gaming server 140 is further communicatively coupled to a database 146. The database 146 may be part of a same device as the gaming server 140 or separate from the gaming server 140, and may be, for example, a network appliance, a computer system, and/or the like operable to implement a database.

As illustrated in and described with respect to FIG. 1, the proxy server 130 is remote from the gaming server 140, and the functionality of the proxy server 130 is separate from the functionality of the gaming server 140. Hence, in such examples, different entities may implement and maintain the proxy server 130 and the gaming server 140. In some examples, the functionality of the proxy server 130 and gaming server 140 may be implemented on a same physical device while maintaining the functionality logically separate, such as on separate virtual machines. In other examples, the functionality of the proxy server 130 may be implemented with and integrated in the functionality of the gaming server 140. Depending on the implementation such as when the functionality of the proxy server 130 is integrated in the functionality of the gaming server 140, some functionality, such as functionality relating to the account manager module 134 or account manager module 144, may be redundant and, therefore, omitted.

Further, as illustrated in and described with respect to FIG. 1, the proxy server 130 is remote from both first controlled-environment facility 100 and second controlled-environment facility 102. In some examples, the proxy server 130 may be at one of the first controlled-environment facility 100 or second controlled-environment facility 102, may be distributed across devices at both first controlled-environment facility 100 and second controlled-environment facility 102, or may have other configurations at various locations. Outside of a controlled-environment facility context, the proxy server 130 may be local to one or more of the users 104, 106, and 108, may be remote from one or more of those users, or may have other configurations at various locations. Similarly, the proxy server 130 may be distributed in various configurations remote from and/or local to various users.

The gaming application module 142 can implement any gaming application, which can be single-player and/or multi-player. For some gaming applications, a user registers and creates an account to access the gaming application. The accounts can be used to ensure that authorized users (e.g., users who have been licensed) access the gaming application and/or to track the respective user's game progression information (e.g., level progression, tokens accumulated, lives remaining, etc.). For such gaming applications, the account manager module 144 can be implemented to register users, store registered users' information, such as log-in credentials, profile, game progression information, etc., in the database 146, and to ensure that registered users are permitted to access the gaming application via the gaming application module 142. In other situations, some gaming applications can be accessible to any user, regardless of any registration, and hence, the account manager module 144 and database 146, and their functionality, may be omitted. However, the gaming application module 142 may create an account for a user for purposes of engaging in game-play of the gaming application when registration is not implemented. For example, the account may be a temporary profile created for the purposes of a given gaming session and associated with a player in the game-play. Further, any account may be associated with a gaming device of the user in addition to or rather than the user.

The proxy server 130 can enable collaborative gaming. A user, or a person operating on the user's behalf, creates an account via the account manager module 134 and the user's gaming device or another device. The account manager module 134 can create an account for each registered user and store the account, and associated information, in the database 138. The user can create log-in credentials to access the marketplace proxy module 132 via the account manager module 134. The log-in credentials can include a user identification and password, in some examples. In other examples, the log-in credentials can further include one or more biometric samples, such as voice samples, fingerprints, facial photos, etc. A biometric sample may be advantageous for a controlled-environment facility context, such as in a jail or prison, to provide a safeguard that the person actually accessing the account, and involved in the game-play, is the actual registered user. For example, if a gaming device includes a microphone, camera, or other appropriate sensor, a voice input, a facial picture, or other biometric input may be captured by the gaming device and compared by the account manager module 134 to the stored biometric sample to ensure that the biometric input matches the stored biometric sample. This can minimize the risk that someone other than the registered user is accessing the account, such as through coercion. The biometric input can be captured and compared with the stored biometric sample upon the account being initially accessed, and further, can be periodically captured and compared with the stored biometric sample to reduce the risk that the registered user hands the gaming device that is logged into the account to another, unauthorized person. Further, the account can store other information relating to the user, such as a personal identification number (PIN), an address or facility identification where the user resides, and/or other information.

A user, or a person operating on the user's behalf, can further link one or more gaming applications, such as the gaming application module 142 or others, to the user's account via the account manager module 134 and the user's gaming device or another device. For example, the account manager module 134 can store in the database 138 and associated with the user's account an access path, such as a web address, to one or more gaming applications and the user's credentials for logging into those one or more gaming applications when those gaming applications implement such log-in requirements. Further, the account manager module 134 can store in the database 138 and associated with the user's account an access path to one or more gaming applications without associated log-in credentials when those gaming applications are accessible to any person regardless of registration.

A user, or a person operating on the user's behalf, can further create rules associated with the user's account via the account manager module 134 and the user's gaming device or another device. The rules can be positive rules (e.g., indicating what the user is permitted to do or access) and/or negative rules (e.g., indicating what the user is prohibited from doing or accessing). For example, some rules may specifically identify gaming applications that the user may access, view, and/or collaborate in game-play (e.g., via the marketplace proxy module 132, as described below), and/or may specifically identify gaming applications that the user is prohibited from accessing, viewing, and/or collaborating in game-play. As another example, the rules may permit and/or prohibit access to, viewing of, and/or collaborating in gaming applications based on a rating of the respective gaming application. For example, a user may be prohibited from accessing, viewing, or collaborating in a gaming application that has a rating of "Adult Only (AO)," and/or may be permitted to access, view, or collaborate in gaming applications that have ratings of "Everyone (E)" or "Everyone 10+(E10+)." Further, the rules may specify which other users with whom the user is permitted to and/or prohibited from interacting or communicating.

A user can log-in, via the account manager module 134, to access the marketplace proxy module 132, which permits the user to initiate a gaming session, view other users' gaming sessions, and collaborate with other users in gaming sessions. A user's gaming device (e.g., the first user gaming device 110 of first user 104) can have an application, such as an Internet browser or other application, that when executed by the device provides a user interface for the user.

Through the user interface, the user can log-in via the account manager module 134 and access the marketplace proxy module 132.

The marketplace proxy module 132 can provide to the user through the user interface gaming options. A first option may be to initiate a gaming session for that user's account with the marketplace proxy module 132. A list of permitted gaming applications may be provided to the user via the user interface, and the user can select (e.g., by pointing and clicking) one or more of the permitted gaming application to initiate the gaming session for that user's account. The gaming applications that populate the list may be based on the gaming applications that are linked by the user's account and/or based on one or more rules associated with the user's account. For a single-player gaming application, the user can initiate the gaming session for the user's account alone. For a multi-player gaming application, the user can initiate a gaming session for that user's account by initiating a gaming session independently of other users (e.g., and allow other users to subsequently join by initiating those users' accounts with that gaming session) and/or by initiating a gaming session for that user's account in a gaming session began by another user. For example, the first user 104 can initiate a gaming session for the account of the first user 104 by independently initiating a gaming session of a two-player gaming application (e.g., to which the second user 106 joins as the second player with the account of the second user 106), and/or by joining a gaming session of a two-player gaming application began by another user (e.g., the second user 106) as the second player with the account of the first user 104.

Another option may be to join one or more on-going gaming sessions of one or more other users for viewing and/or collaborating with the game-play. Similarly, a list of permitted on-going gaming sessions may be provided to the user via the user interface, and the user can select (e.g., by pointing and clicking) one or more of the permitted gaming sessions. The on-going gaming sessions may be initiated by other users and are on-going through the marketplace proxy module 132. The on-going gaming sessions that populate the list may be based on one or more rules associated with the user's account, such as based on permitted gaming applications, whether other user(s) who are currently joined to the gaming session are permitted to interact with the user, and/or other rules.

The presentation of options to the user through the user interface can take any form. For example, the options may be presented in a single list or broken out into multiple lists; icons can be presented for the different options; etc. Further, in some circumstances for a multi-player gaming application of an on-going gaming session, the user may be presented with the option to initiate that gaming session for that user's account by joining the game-play as a new player with the user's account or to join that gaming session for viewing and/or collaborating with the game-play.

Users may be required to pay a fee to initiate, observe, or join a gaming session. For example, account manager module 134 and/or account manager module 144 may track funds associated with user accounts. Different fee amounts may be required for different levels of participation levels (e.g., higher fees to participate/join compared to simply observing). In other embodiments, fees may vary depending upon whether a user is a resident or friends/family of a resident. Higher levels of participation (e.g., more participation and/or more communication options) may require higher fees compared to lower levels of participation (e.g., observation only or no inter-user communication).

If the user selects to initiate a gaming session from a gaming application, the marketplace proxy module 132 can provide to the user through the user interface the option of making the gaming session public, semi-public, or private. For example, if the gaming session is selected to be public, the gaming session may be published to and populate lists of on-going gaming sessions of other users logged into the marketplace proxy module 132 without restriction from the user that initiates the gaming session; however, other rules may provide for various restrictions on publication of gaming sessions or related information. If the gaming session is selected to be semi-public, the user may allow other users to access the gaming session based on identifying users to whom the gaming session may be published and/or by sending invitations to selected users via the marketplace proxy module 132. Alternatively or additionally, the user may identify one or more users that should be blocked from joining the user's gaming session. Users who are invited or blocked may be selected from, for example, a list of users populated by the account manager module 134. If the gaming session is selected to be private, only the user may access the gaming session in a single-player gaming application, and/or only the users corresponding to multiple players in a multi-player gaming application may access the gaming session, for example. The marketplace proxy module 132 may permit the user to change the status of the gaming session from private, public, etc., to another status at any time during the gaming session.

If the user selects initiating the gaming session as private, the user can play the gaming session using the marketplace proxy module 132 as a proxy to the corresponding gaming application module (e.g., the gaming application module 142 on the gaming server 140). If the gaming application module implements registration by using an account, the marketplace proxy module 132 can access the corresponding credentials for the gaming application stored in the database 138 by the account manager module 134, and can automatically use those credentials to log the user into the gaming application module (e.g., via the account manager module 144 on the gaming server 140). The user can engage in game-play with the gaming application module using the marketplace proxy module 132 as a proxy. Once the gaming session is concluded (e.g., by reaching an end of the game, by termination by the user, and/or other action), the gaming application module may store information relating to the game progression and the user in a database (e.g., the database 146) associated with the user's account with that gaming application. In some examples, the gaming application module and/or the marketplace proxy module 132 may periodically and/or arbitrarily store such information automatically and/or based on a command input from the user to store the information. Further, once the gaming session is concluded, the marketplace proxy module 132 may provide to the user through the user interface lists of permitted gaming applications to initiate another gaming session and/or permitted on-going gaming sessions to join. Also, the user may log out of the marketplace proxy module 132 to terminate the user's session on the marketplace proxy module 132.

If the user selects initiating the gaming session as semi-public or public, the user can play the gaming session using the marketplace proxy module 132 as a proxy to the corresponding gaming application module like described above when the gaming session is selected as private. When the gaming session is semi-public or public, other users, using their respective gaming devices, can join the initiating user in the gaming session, via the marketplace proxy module 132, to view and/or collaborate in the game-play. For example, if each of the first user 104, second user 106, and third user 108, using corresponding first user gaming device 110, second user gaming device 112, and third user gaming device 114, logs in to the marketplace proxy module 132 via the account manager module 134, and the first user 104 initiates a gaming session selected as semi-public or public, the gaming session may populate a list of permitted on-going gaming sessions available to the second user 106 and third user 108 via the marketplace proxy module 132 and/or may be the basis of an alert to the second user 106 and third user 108 when an invitation is sent by the first user 104, for example. The second user 106 and third user 108 may then select to join the on-going gaming session initiated by the first user 104.

When a user joins an on-going gaming session, the user, via the user's gaming device, is permitted to view the game-play of the gaming session via the marketplace proxy module 132. Further, the user, via the user's gaming device, may be able to take control of a player/account from another user, such as the initiating user, during the game-play. In some examples, the initiating user can control the gaming session to be in a viewing only mode or in a contribute mode where other users may be permitted to control the player/account. The initiating user in a single player game and each initiating user in a multi-player game can control, via the marketplace proxy module 132, how and by whom (e.g., within the users that joined the gaming session) that user's player/account in the game-play is controlled. For example, the initiating user may allow for other users to receive control of the initiating user's player/account at predetermined or arbitrary times or instances during the game-play and based on a queue (e.g., first in line to request control receives the control first), on arbitrarily granting requests from other users, on arbitrarily inviting other users to take over control, and/or another basis. Further, the initiating user can control a duration that the initiating user's player/account is under the control of another user. For example, the initiating user can set a pre-defined duration for another user to control the player/account, can set some rule upon which the other user's control of the player/account is terminated (e.g., upon exhausting a play or life in the game-play), can arbitrarily terminate the other user's control of the player/account, and/or another basis for limiting the control of the player/account by the other user. As an example, the initiating user can allow joined users to queue, and the control of the initiating user's player/account can be first relinquished to the first person in the queue and subsequently automatically relinquished to others in the queue based on their order in the queue (e.g., first-in, first out), where each joined user is permitted to maintain control for a predetermined length of time and/or number of plays or lives in the game-play. In some examples, the initiating user can block one or more joining users from taking control of the player/account.

The control of a player/account by a user different from the initiating user can occur by receiving input from the gaming device of the non-initiating user and routing that input through the initiating user's account through the marketplace proxy module 132. Once control of the player/account by the user that is not the initiating user is terminated, control of the player/account returns to the initiating user, who can continue game-play with the player/account and/or relinquish control of the player/account to another user.

As an illustration, the first user 104, via the first user gaming device 110, logs into the marketplace proxy module 132 and initiates a single-player gaming session with the gaming application module 142 using the marketplace proxy module 132 as a proxy. The marketplace proxy module 132 logs into the gaming application module 142 via the account manager module 144 using the credentials of the first user 104 associated with the gaming application module 142 and stored in the account of the first user 104 in the database 138. The third user 108, via the third user gaming device 114, also logs into the marketplace proxy module 132 and selects to join the on-going gaming session initiated by the first user 104. The third user 108, via the third user gaming device 114, then is able to view the game-play as the first user 104 controls the player/account through the game-play. Then, assume that the first user 104 is unsuccessful at overcoming a level or challenge. The first user 104 may relinquish control of the player/account of the first user 104 to the third user 108 who has joined the gaming session. The first user 104 may set a rule that the third user 108 can have control of the player/account until the third user 108 has exhausted one gaming life or has overcome the level or challenge. The third user 108, via the third user gaming device 114, can then play the gaming application on the behalf of the first user 104 until the third user 108 loses one gaming life or overcomes the level or challenge, at which point the first user 104 takes control back over of the player/account of the first user 104. Hence, the first user 104 and third user 108 can collaborate to achieve a level of success in the game-play that first user 104 would not have been able to achieve alone.

Users other than an initiating user can join and leave a gaming session at any time. For such users, upon leaving a gaming session, the marketplace proxy module 132 may provide to the users through the user interfaces lists of permitted gaming applications to initiate another gaming session and/or permitted on-going gaming sessions to join. Further, the initiating user in a single-player gaming application or a last remaining initiating user in a multi-player gaming application can conclude, or terminate, the gaming session. Any non-initiating users that were joined to the gaming session upon the conclusion of the gaming session may be provided, by the marketplace proxy module 132, the lists of permitted gaming applications and/or permitted on-going gaming sessions. Further, once the gaming session is concluded, the marketplace proxy module 132 may provide to the initiating user through the user interface lists of permitted gaming applications to initiate another gaming session and/or permitted on-going gaming sessions to join. Also, any of the users may log out of the marketplace proxy module 132 to terminate the respective user's session on the marketplace proxy module 132.

At various points in the game-play and/or the conclusion of a gaming session, the gaming application and/or the marketplace proxy module 132 may store gaming related information with appropriate accounts of that gaming application and/or accounts managed by the account manager module 134. If, for example, the functionality described above of marketplace proxy module 132 for relinquishing control of a player/account is integrated in a gaming application module (e.g., the gaming application module 142), then that gaming application module may require each user to register and be logged in to respective accounts during the game-play. In such a situation, upon control of the player/account transitioning to another user and/or conclusion of the game-play, the gaming application can store, for example, game progression information (e.g., what levels a user overcame) associated with the account of the user that was in control during the corresponding progression, and/or can be stored associated with the initiating user's account regardless of which user was in control. If the marketplace proxy module 132 is separate from the gaming application module, as illustrated in FIG. 1, game progression information may be stored associated with the account of the gaming application (e.g., via account manager module 144) associated with the initiating user regardless of which user was in control, in some examples. In other examples, the users in the gaming session can have accounts with the account manager module 134 that are linked to respective accounts with the account manager module 144, and the marketplace proxy module 132 can attribute game progression information to different accounts with the account manager module 144 based on which user controlled the game-play during the game progression. Such information can be stored in those accounts upon control of the player/account transitioning to another user and/or conclusion of the game-play. In some examples, game progression information can be stored in the database 138 by the account manager module 134 associated with the different user accounts. In the above examples, the information can be stored more frequently, such as based on some elapsed duration or other basis.

The marketplace proxy module 132 can also monitor inactivity of users. Once logged on to the marketplace proxy module 132 via the account manager module 134, if the logged-in user is inactive for a predefined duration, the marketplace proxy module 132 and/or account manager module 134 can automatically log the user off from the marketplace proxy module 132, which may further terminate any gaming session that the user initiated. This can reduce the likelihood that an unauthorized person accesses the users account when, for example, the user leaves the user's gaming device unattended. Further, if the user has initiated a gaming session and relinquished control of the player/account to another user, inactivity by the initiating user can be indicative of an attempt by the users to circumvent licensing restrictions rather than engaging in collaborative game-play. Hence, logging off an initiating user from the marketplace proxy module 132 after a predefined duration of inactivity can reduce the likelihood that the gaming applications are being improperly used.

In some examples, the marketplace proxy module 132 can further monitor for aggressive game-play in a gaming session. For example, the marketplace proxy module 132 may monitor a frequency of input from a user during game-play. Higher frequency input may be indicative of aggressive behavior. In other examples, the marketplace proxy module 132 can monitor the nature of the game-play, such as monitoring interactions between different players and/or characters, to identify possible aggressive behavior. If aggressive behavior is detected, the marketplace proxy module 132 may terminate the game-play of the user, which can include terminating control of another user's player/account, terminating the gaming session, or other actions. In some examples, the marketplace proxy module 132 may alert authorized personnel to possible aggressive behavior, such as by email, text message, telephone call, and/or the like, and the authorized personnel then can have the capability of viewing the game-play, such as through the monitoring module 136 described below, and taking appropriate action in response to the detected behavior.

The marketplace proxy module 132 may permit communication between users when those users are part of a gaming session. For example, the marketplace proxy module 132 may provide for text, audio, and/or video communications contemporaneously with the game-play. By allowing for such communications, a viewing user may provide tips and pointers to a playing user during the game-play, for example.

In some examples, communications through the marketplace proxy module 132 are monitored and/or recorded by the monitoring module 136, such as being stored in the database 138 or another database. In the context of a controlled-environment facility, such as a jail or prison, residents acting as users may be prohibited from discussing certain topics, and therefore, communications through the marketplace proxy module 132 may be monitored by the monitoring module 136 to detect prohibited communications. In some examples, the monitoring module 136 records all communications through the marketplace proxy module 132 in the database 138. Depending on the mode of communication (e.g., text or audio), the monitoring module 136 may use various techniques to detect words or subjects of the communication. This detection can trigger an alert to authorized personnel (e.g. by text message, email, telephone call, etc.), can be used to bookmark in a recording where a detected word was communicated, and/or other actions. The recorded communications stored in the database 138 or other database can be used for subsequent investigations.

Further, authorized personnel may log into the monitoring module 136 to view what is occurring in the marketplace proxy module 132. Authorized personnel may include, for example, parents or guardians of a user, personnel overseeing or caring for a resident in a controlled-environment facility (e.g., guards, staff, nurses, teachers), and/or the like. The authorized personnel can view which users are engaged and/or collaborating in game-play in an on-going gaming session. The authorized personnel may view communications between viewers, such as communication that was previously recorded and/or current communication for, on-going games. The authorized personnel may view the game-play of users. In some examples, authorized personnel can terminate on-going gaming sessions via the monitoring module 136 and/or the marketplace proxy module 132. Further, authorized personnel may be able to intervene in gaming sessions to stop users from communicating with each other and/or from collaborating in game-play together, such as when those users may be able to initiate and/or join a gaming session despite rules being in place that are intended to prevent such communication and/or collaboration.

Figure 2:
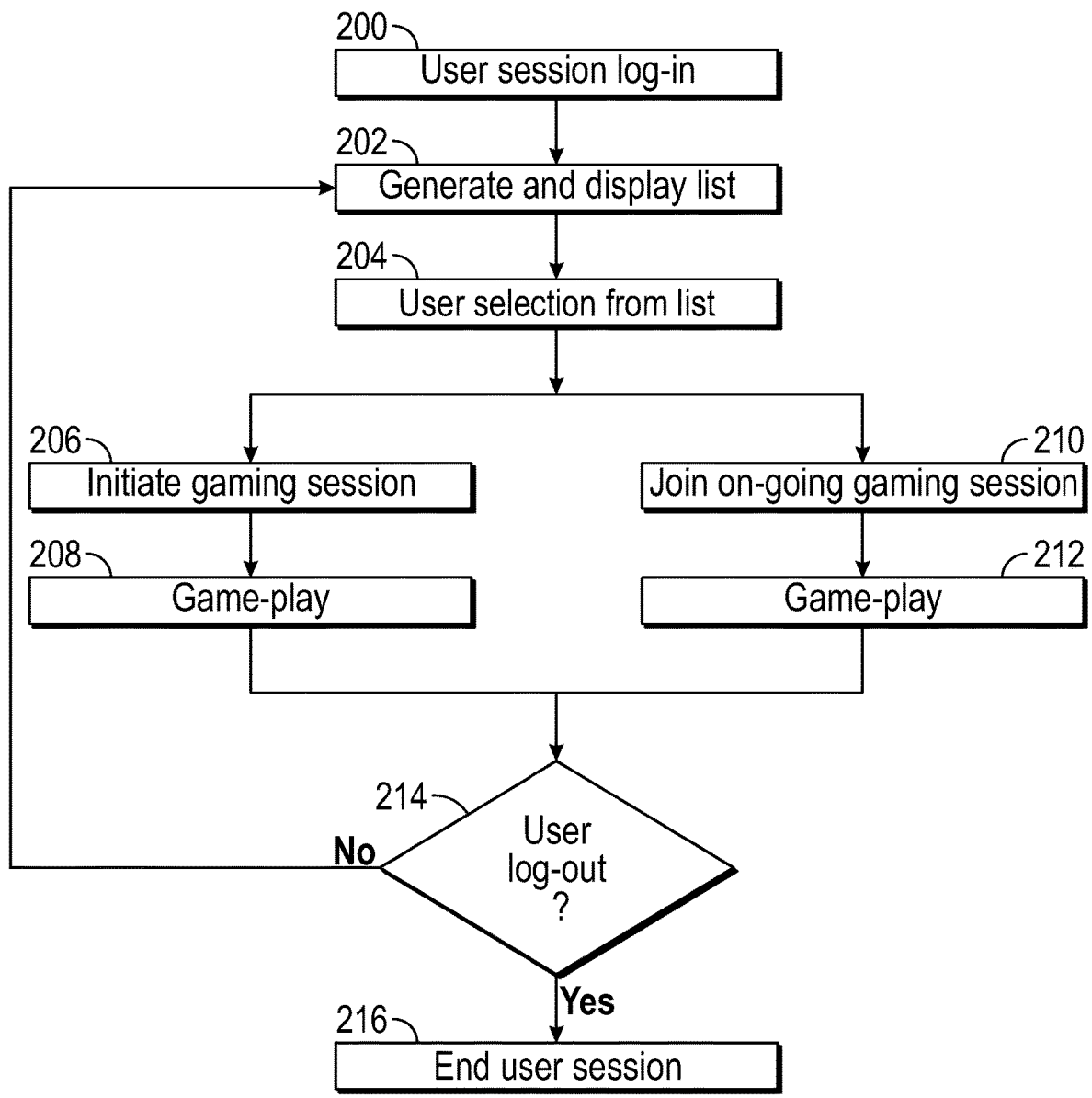
FIG. 2 is an example method for collaborative game-play in accordance with some embodiments.

FIG. 2 illustrates an example method for collaborative game-play in accordance with some embodiments. Features may be added to and/or omitted from the illustrated method in other embodiments. Further, the method may be performed in any logical order.

A user logs into a user session 200 of a marketplace proxy module. For example, with reference to FIG. 1., the first user 104 logs in via a user interface on the first user gaming device 110 to the marketplace proxy module 132 via the account manager module 134 that manages the account of the first user 104. The marketplace proxy module generates and displays a list 202 of permitted gaming applications that may be initiated and of permitted on-going gaming sessions that may be joined. Continuing the above example, the marketplace proxy module 132 generates a list of permitted gaming applications that may be initiated based on the account of the first user 104 stored in the database 138, including any linked gaming applications, stored credentials, rules, etc., and of permitted on-going gaming sessions that may be joined based on games that are on-going through the marketplace proxy module 132 by other users and based on the account of the first user 104 stored in the database 138, including any linked gaming applications, stored credentials, rules, etc. The marketplace proxy module 132 displays the list to the first user 104 through the user interface of the first user gaming device 110. The user selects an option, e.g., a gaming application to initiate or an on-going gaming session to join, from the list 204. For example, the first user 104 selects an option through the user interface on the first user gaming device 110, which selected option is transmitted to the marketplace proxy module 132.

If the selected option is a gaming application to initiate for the user's account, the gaming session is initiated 206 by the marketplace proxy module, which may be a single-player or multi-player gaming application. For example, the marketplace proxy module 132 acts as a proxy to log into the gaming application module 142, via the account manager module 144, using the credentials of the first user 104 associated with the gaming application module 142 stored with the account of the first user 104 in the database 138 by the account manager module 134. Game-play 208 commences with the marketplace proxy module as a proxy. Game-play 208 continues to its conclusion.

If the selected option is an on-going gaming application to join, the marketplace proxy module joins the user with the on-going gaming session 210. For example, the marketplace proxy module 132 acting as a proxy for the on-going gaming session permits the first user 104 to join the gaming session. Game-play 212 continues, until its conclusion or until the user leaves the gaming session, with the marketplace proxy module as the proxy.

At the conclusion of the game-play 208, 212, the user may log out 214. If the user does not log out, the marketplace proxy module loops to generate and display a list 202 of permitted gaming applications that may be initiated and of permitted on-going gaming sessions that may be joined. If the user does log out, the marketplace proxy module ends the user session 216.

Figure 3:
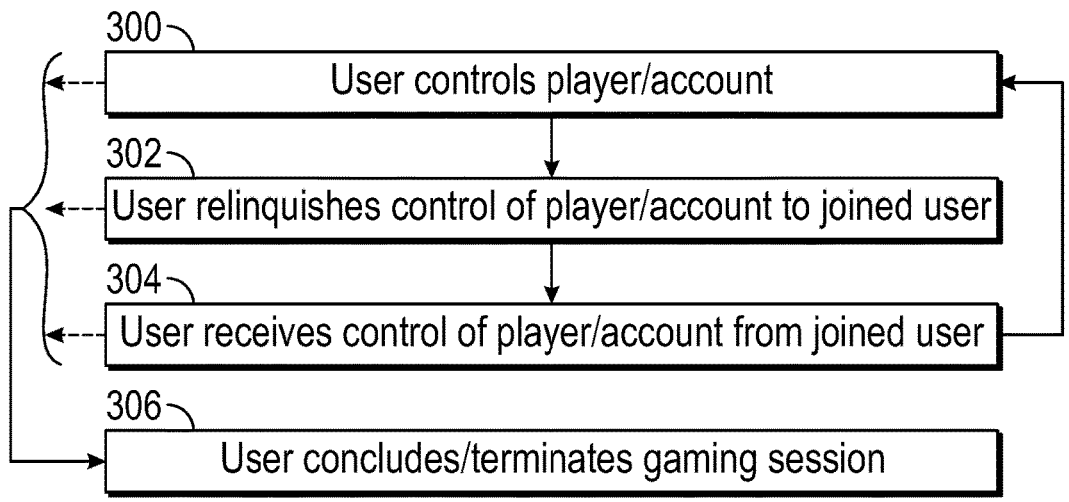
FIG. 3 is an example method for game-play in accordance with some embodiments.

FIG. 3 illustrates an example method for game-play 208 in FIG. 2 in accordance with some embodiments. Features may be added to and/or omitted from the illustrated method in other embodiments. Further, the method may be performed in any logical order. Once the marketplace proxy module initiates the game-play as described above, the user, via the user's gaming device, controls the user's player/account 300 associated with that game-play. As described above, the user may relinquish control of the user's player/account to a joined user 302 that has joined the gaming session. The joined user can control the user's player/account with the joined user's gaming device. For example, the first user 104 that initiated the gaming session may relinquish control of the player/account of the first user 104 to the second user 106 who joined the gaming session after the first user 104 initiated the gaming session. The user can control to whom and how control of the user's player/account is relinquished, such as described above. The user can then receive control of the user's player/account from the joined user 304, and the user can control the player/account 300 in the game-play. At any point in the game-play, the user can terminate the gaming session and/or the gaming session may be concluded 306.

Figure 4:
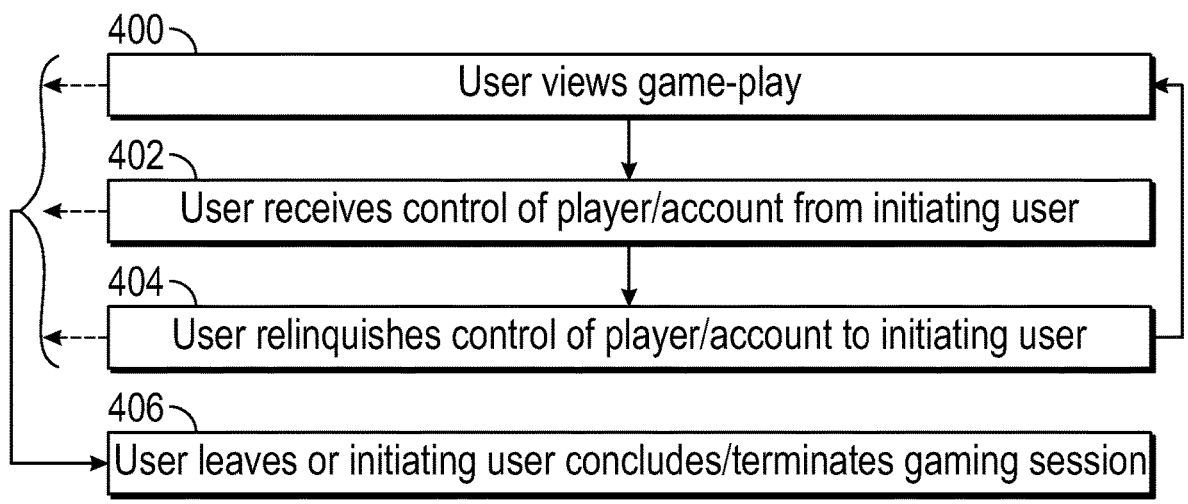
FIG. 4 is an example method for game-play in accordance with some embodiments.

FIG. 4 illustrates an example method for game-play 212 in FIG. 2 in accordance with some embodiments. Features may be added to and/or omitted from the illustrated method in other embodiments. Further, the method may be performed in any logical order. Once the user joins an on-going gaming session via the marketplace proxy module as described above, the user, via the user's gaming device, views game-play 400 while another user, such as an initiating user, plays the gaming application. As described above, the user may receive control of the initiating user's player/account from the initiating user 402. The user can control the initiating user's player/account through the user's gaming device. For example, the first user 104 that joined the on-going gaming session may receive control of the player/account of the second user 106 who initiated the gaming session that second controlled-environment facility 102 joined. The initiating user can control to whom and how control of the initiating user's player/account is received and continued to be used, such as described above. The user can then relinquish control of the initiating user's player/account to the initiating user 404 or another user, and the user can continue viewing the game-play 400. At any point in the game-play, the user can leave the gaming session and/or the initiating user can terminate and/or conclude the gaming session 406.

Figure 5:
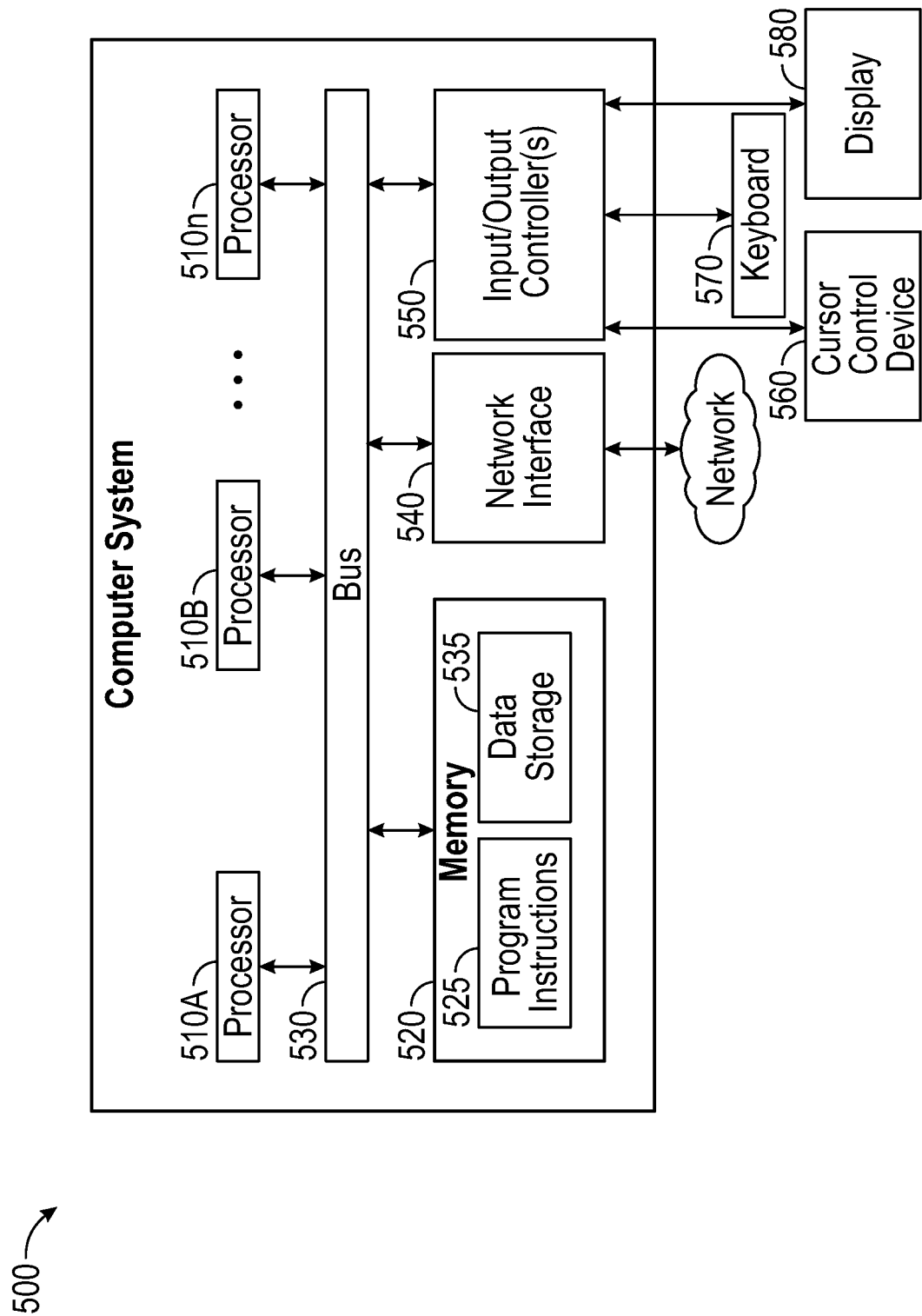
FIG. 5 is an example schematic of a computer system in accordance with some embodiments.

Embodiments of systems and methods for collaborative gaming, as described herein, may be implemented or executed by one or more computer systems. One such computer system is illustrated in FIG. 5. In various embodiments, computer system 500 may be a server, a mainframe computer system, a network appliance, a workstation, a network computer, a desktop computer, a laptop, a tablet, a handheld device, a gaming console, or the like. For example, in some cases, the first user gaming device 110, second user gaming device 112, third user gaming device 114, proxy server 130, database 138, gaming server 140, and gaming application module 142 shown in FIG. 1 may include at least one computer such as computer system 500. As explained above, in different embodiments these various computer systems may be configured to communicate with each other in any suitable way, such as, for example, via networks 116, 118, and/or 120.

As illustrated, computer system 500 includes one or more processors 510A-N coupled to a system memory 520 via bus 530. Computer system 500 further includes a network interface 540 coupled to bus 530, and one or more I/O controllers 550, which in turn are coupled to peripheral devices such as cursor control device 560, keyboard 570, display(s) 580, etc. Each of I/O devices 560, 570, 580 may be capable of communicating with I/O controllers 550, for example, via a wired connection (e.g., serial port, Universal Serial Bus port) or wireless connection (e.g., Wi-Fi, Bluetooth, Near Field Communications Link, etc.) Other devices may include, for example, microphones, antennas/wireless transducers, phone detection modules, etc.

In various embodiments, computer system 500 may be a single-processor system including one processor 510A, or a multi-processor system including two or more processors 510A-N (e.g., two, four, eight, or another suitable number). Processors 510 may be any processor capable of executing program instructions. For example, in various embodiments, processors 510 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 510 may commonly, but not necessarily, implement the same ISA. Also, in some embodiments, at least one processor 510 may be a graphics processing unit (GPU) or another dedicated graphics-rendering device.

System memory 520 may be configured to store program instructions and/or data accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. As illustrated, program instructions and data implementing certain operations and modules such as those described herein may be stored within system memory 520 as program instructions 525 and data storage 535, respectively. In other embodiments, program instructions and/or data may be received, sent, or stored upon different types of computer-accessible media or on similar media separate from system memory 520 or computer system 500.

A computer-accessible medium may include any tangible and/or non-transitory storage media or memory media such as electronic, magnetic, or optical media—e.g., disk or CD/DVD-ROM coupled to computer system 500 via bus 530. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 530 may be configured to coordinate I/O traffic between processor 510, system memory 520, and any peripheral devices in the computer system, including network interface 540 or other peripheral interfaces, such as input/output devices 550. In some embodiments, bus 530 may perform any necessary protocol, timing, or other data transformations to convert data signals from one component (e.g., system memory 520) into a format suitable for use by another component (e.g., processor 510). In some embodiments, bus 530 may include support for devices attached through various types of peripheral buses, such as a variant of the Peripheral Component Interconnect (PCI) bus standard or the Universal Serial Bus (USB) standard, for example. In some embodiments, the function of bus 530 may be split into two or more separate components, such as a northbridge chipset and a southbridge chipset, for example. In addition, in some embodiments some or all the functionality of bus 530, such as an interface to system memory 520, may be incorporated directly into processor(s) 510A-N.

Network interface 540 may be configured to allow data to be exchanged between computer system 500 and other devices attached to a network, such as other computer systems, or between nodes of computer system 500. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 550 may, in some embodiments, enable communications with one or more display terminals, keyboards, keypads, touchpads, scanning devices, voice or optical recognition devices, mobile devices, or any other devices suitable for entering or retrieving data by one or more computer system 500. Multiple I/O controllers 550 may be present in computer system 500 or may be distributed on various nodes of computer system 500. In some embodiments, I/O devices may be separate from computer system 500 and may interact with one or more nodes of computer system 500 through a wired or wireless connection, such as over network interface 540.

As shown in FIG. 5, memory 520 may include program instructions 525, configured to implement certain embodiments described herein, and data storage 535, comprising various data may be accessible by program instructions 525. In an embodiment, program instructions 525 may include software elements shown in FIG. 1, which may be configured to affect the operations discussed in FIGS. 2 through 4. Program instructions 525 may be implemented in various embodiments using any desired programming language, scripting language, or combination of programming languages and/or scripting languages (e.g., C, C++, C#, Java™, JavaScript™, Perl, etc.). Data storage 535 may include data that may be used in these embodiments (e.g., recorded communications, profiles for different modes of operations, etc.). In other embodiments, other or different software elements and data may be included.

A person of ordinary skill in the art will appreciate that computer system 500 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

It should be understood that the various operations described herein, particularly in connection with FIGS. 2 through 4, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

The various systems and methods illustrated in the figures and described herein represent example embodiments. The methods may be implemented in software, hardware, or a combination thereof. The order in which each operation of a given method is performed may be changed, and various elements of the systems or devices illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A system, comprising:
a computer system comprising at least one processor and a memory coupled to the at least one processor, the memory storing program instructions executable by the at least one processor to cause the computer system to:
enable a first user, via a first gaming device, to initiate a gaming session of a gaming application using an account of the first user;

provide a second user with a list of gaming sessions available for participation by the second user, wherein the gaming session initiated by the first user is included in the list based on whether the second user and the first user are prohibited from communicating;

enable the second user, via a second gaming device distinct from the first gaming device, to join the initiated gaming session by selecting the initiated gaming session from the list; and enable the second user, via the second gaming device, to engage in game-play in the initiated gaming session on behalf of the first user, wherein the second user engages in the game-play using the account of the first user.

2. The system of claim 1, wherein the computer system is a proxy server remote from a gaming server, wherein the gaming application is operated using the gaming server.

3. The system of claim 1, wherein the program instructions further cause the computer system to enable the first user to control when the second user is enabled to engage in the game-play on behalf of the first user.

4. The system of claim 1, wherein the program instructions further cause the computer system to enable the first user to terminate the second user who was enabled to engage in the game-play on behalf of the first user.

5. The system of claim 1, wherein the program instructions further cause the computer system to enable the first user to block the second user from being enabled to engage in the game-play on behalf of the first user.

6. The system of claim 1, wherein the program instructions further cause the computer system to enable the first user to define a condition under which the second user is no longer enabled to engage in the game-play on behalf of the first user.

7. The system of claim 1, wherein the program instructions further cause the computer system to enable the second user to view the game-play in the initiated gaming session when the first user is engaged in the game-play using the account of the first user.

8. The system of claim 1, wherein the program instructions further cause the computer system to enable the first user and the second user to communicate with each other.

9. The system of claim 8, wherein the program instructions further cause the computer system to record and store in a database communications between the first user and the second user.

10. The system of claim 1, wherein the gaming application is a single-player gaming application.

11. The system of claim 1, wherein the gaming application is a multi-player gaming application, wherein the initiated gaming session is based on a player of the multi-player gaming application using the account of the first user.

12. The system of claim 1, wherein the program instructions further cause the computer system to prohibit the first user, via the first gaming device, from initiating a gaming session of a prohibited gaming application.

13. The system of claim 1, wherein the program instructions further cause the computer system to prohibit the second user, via the second gaming device, from joining an initiated gaming session of a prohibited gaming application.

14. A tangible computer-readable storage device having program instructions stored thereon that, upon execution by at least one processor of a computer system, cause the computer system to:

enable an initiating user, via a first gaming device, to initiate a gaming session of a gaming application with an account of the initiating user;

provide a joining user with a list of gaming sessions available for participation by the joining user, wherein the gaming session initiated by the first user is included in the list based on whether the joining user and the first user are prohibited from communicating;

enable the joining user, via a second gaming device separate from the first gaming device, to join the initiated gaming session by selecting the initiated gaming session from the list;

enable the joining user, via the second gaming device, to view a game-play of the gaming session; and enable the initiating user, via the first gaming device, to relinquish control of the game-play using the account of the initiating user to the joining user for the joining user, via the second gaming device, to control the game-play using the account of the initiating user.

15. The tangible computer-readable storage device of claim 14, wherein the program instructions, upon execution by the at least one processor, further cause the computer system to enable the initiating user, via the first gaming device, to define a condition under which the joining user is no longer enabled to control the game-play using the account of the initiating user.

16. The tangible computer-readable storage device of claim 14, wherein the program instructions, upon execution by the at least one processor, further cause the computer system to enable the initiating user and the joining user to communicate with each other.

17. The tangible computer-readable storage device of claim 14, wherein the program instructions, upon execution by the at least one processor, further cause the computer system to:

prohibit the initiating user, via the first gaming device, from initiating a gaming session of a prohibited gaming application; and prohibit the joining user, via the second gaming device, from joining an initiated gaming session of a prohibited gaming application.

18. A method, comprising:

operating at least one computer system comprising:

initiating a gaming session of a gaming application based on input from a first gaming device of a first user, the gaming session being initiated with an account of the first user;

providing a second user with a list of gaming sessions available for participation by the second user, wherein the gaming session initiated by the first user is included in the list based on whether the second user and the first user are prohibited from communicating;

joining a second user, via a second gaming device distinct from the first gaming device, to the initiated gaming session by the second user selecting the initiated gaming session from the list; and providing control of game-play of the initiated gaming session to the second user, via the second gaming device, using the account of the first user.

19. The method of claim 18, wherein the providing control of the game-play to the second user is controlled by the first user, via the first gaming device.

20. The method of claim 18, wherein operating the at least one computer system further comprises providing viewing capabilities of the game-play of the initiated gaming session to the second user, via the second gaming device, when the second user does not control the game-play of the initiated gaming session.

21. The method of claim 18, wherein operating the at least one computer system further comprises providing communication capabilities to permit communication between the first user and the second user.

22. The method of claim 18, wherein operating the at least one computer system further comprises:
- prohibiting the first user, via the first gaming device, from initiating a gaming session of a prohibited gaming application; and
- prohibiting the second user, via the second gaming device, from joining an initiated gaming session of a prohibited gaming application.

* * * * *